Oct. 2, 1951 B. W. V. I. SCHENAU ET AL 2,570,014
CIRCUIT ARRANGEMENT FOR PRODUCING HIGH-DIRECT VOLTAGES
Filed Feb. 15, 1950 2 Sheets-Sheet 1

BERNARDUS WILLEM VAN INGEN SCHENAU
GERRIT JAN LUBBEN
*INVENTORS*

BY Fred M. Vogel
AGENT

BERNARDUS WILLEM VAN INGEN SCHENAU
GERRIT JAN LUBBEN
*INVENTORS*

BY Fred M. Vogel
AGENT

UNITED STATES PATENT OFFICE 2,570,014

CIRCUIT ARRANGEMENT FOR PRODUCING HIGH-DIRECT VOLTAGES

Bernardus Willem van Ingen Schenau and Gerrit Jan Lubben, Eindhoven, Netherlands, assignors to Hartford National Bank and Trust Company, Hartford, Conn., as trustee Application February 15, 1950, Serial No. 144,366 In the Netherlands February 17, 1949

8 Claims. (Cl. 171—97)

The invention relates to circuit-arrangements for producing high direct voltages.

In some circuit-arrangements, for example in circuit-arrangements for controlling the high voltage supply for the cathode-ray tube of a television receiver, use is made of a non-controllable pulse voltage source, since in such a receiver a sawtooth current produced across the anode circuit of a discharge tube is generally available and is supplied as a deflection current to the magnetic deflecting system of the cathode-ray tube of the receiver. Across the inductive load available in the anode circuit of the discharge tube is then produced a pulsatory voltage, which by means of a voltage multiplier may be converted into a high voltage.

The high voltage produced may be used as the high voltage supply to the said cathode-ray tube but due to the varying cathode-ray current strength it constitutes a variable load on the high voltage source of comparatively high impedance, with the result that the high voltage produced does not remain constant, so that, particularly with magnetic focussing of the cathode-ray tube, lack of definition and variation in size of the image ensues. If the said discharge tube were controlled as a function of the load so that the high voltage remained constant, the value of the deflection current would vary, so that the image would vary in size (respiration).

Thus, a non-controllable pulse voltage source is generally available, which permits of producing a high voltage which, however, varies as a function of the load. The term "non-controllable" is to be understood to mean that the pulses concerned cannot be controlled, at least as far as the amplitude is concerned.

The invention has for its object to provide means to produce a substantially constant high voltage with the use of the available, non-controllable pulse voltage source. It is based on the idea that connecting a voltage multiplier after the non-controllable voltage source permits of summing the direct voltage produced by the non-controllable voltage source with a direct voltage originating from a controllable pulse voltage source. This controllable pulse voltage source needs to supply in this case less voltage and energy than if it were used as the sole pulse supplier for producing the high voltage.

According to the invention, a circuit-arrangement for producing a high direct voltage with the use of a voltage multiplier fed by pulses and comprising the series combination of a number of rectifiers of identical conducting phase and a number of capacitors, at least one electrode of each succeeding capacitor having a greater potential relative to each than either electrode of the preceding capacitor is characterised by the combination of a non-controllable and a controllable pulse voltage source, followed by the said voltage multiplier which sums a whole multiple of the rectified, non-controllable pulse voltage with a whole multiple of the rectifier, controllable pulse voltage.

In order that the invention may be more clearly understood and readily carried into effect, it will now be described with reference to the accompanying diagrammatic drawing, given by way of example, in which.

Figure 1:
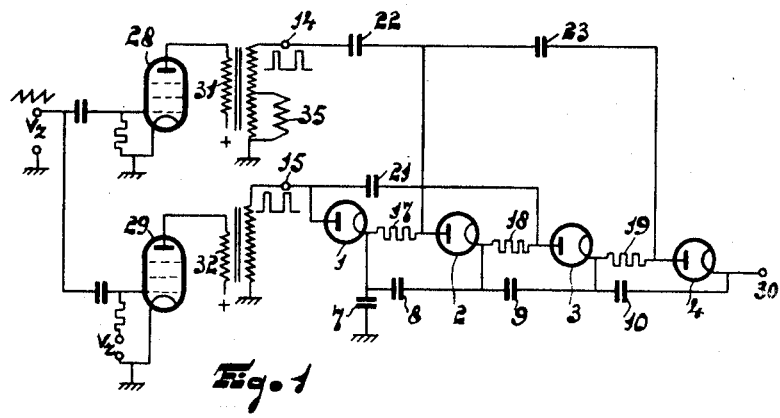
Fig. 1 shows a circuit-arrangement comprising a controllable and a non-controllable pulse voltage source, producing pulses of similar polarities.

Referring now to Fig. 1, a voltage multiplier is fed by pulses and comprises the series combination of a number of rectifiers 1, 2, 3 and 4, of similar conducting phase, and a number of capacitors 7, 8, 9 and 10 the electrodes of which connected to the cathodes of the rectifiers 1, 2, 3 and 4, respectively, are at successively ascending potentials relative to earth.

The voltage multiplier is fed by pulses from a non-controllable pulse voltage source 14 and pulses from a controllable pulse voltage source 15.

The pulse voltage sources 14 and 15 produce positive-going pulses. The series combination comprising the rectifiers 1, 2, 3 and 4 also comprises impedances, resistances and/or inductances 17, 18 and 19 which allow the passage of direct current.

The pulsatory voltage produced by the controllable pulse voltage source 15 is supplied to the anode of the first diode and through a capacitor 21 to the anode of the third diode. The pulsatory voltage produced by the non-controllable pulse voltage source 14 is supplied through a capacitor 22 to the anode of the second diode and through capacitors 22 and 23 to the anode of the fourth diode. The capacitors 21, 22 and 23 need only to be capable of withstanding an operating voltage equal to the sum of the amplitudes of the voltages produced by the pulse voltage sources 14 and 15. As an alternative, the voltages produced by the sources 14 and 15 may be supplied respectively to another combination of numbers of rectifiers different from that shown in Fig. 1. The high voltage produced is then equal to the sum of the products of the respective numbers and the amplitudes of the associated pulses.

The pulse voltage sources 14 and 15 comprise discharge tubes 28 and 29 controlled by an external sawtooth voltage Vz and the anode circuits of which include the primaries of transformers 31 and 32. The source 14 is non-controllable since the sawtooth voltage produced across the anode circuit of discharge tube 28 is also used as a deflection current for the deflection windings 35 of a cathode-ray tube, for example of a television receiver. However, it may still be used to produce not inconsiderable part of the direct supply voltage required for such a cathode-ray tube.

The pulse voltage source 15 supplies pulses of controllable amplitude. The tube 29 may, for example, be controlled by the sawtooth control-voltage Vz, whilst across its grid circuit a control-voltage Vr for controlling the pulse amplitude is made effective. As alternatives, the discharge tubes 28 and 29 of the two pulse voltage sources 14 and 15 may be controlled independently of one another, or may themselves produce pulses by self-oscillation due to feedback.

The circuit-arrangement shown may be varied in a number of ways. For example, the electrode of each of the capacitors 8, 9 and 10 more remote from the high voltage terminal 30 may be connected to earth potential. In this case the said capacitors must be capable of withstanding a higher operating voltage. The same observation applies to the capacitor 23, of which the electrode more remote from the high voltage terminal 30 may be connected directly to the pulse voltage source. As an alternative, capacitor 22 may be dispensed with by connecting the lower side of the secondary winding of the anode transformer 31 not to earth but to the cathode of the tube 1. In this case resistance 17 may also be dispensed with.

Furthermore it is not necessary to use voltage multipliers, if the required direct voltage is not excessive, so that the circuit arrangement may comprise only two diodes 1 and 2, to the first of which the pulses 15 and to the second of which the pulses 14 are supplied.

Figure 2:
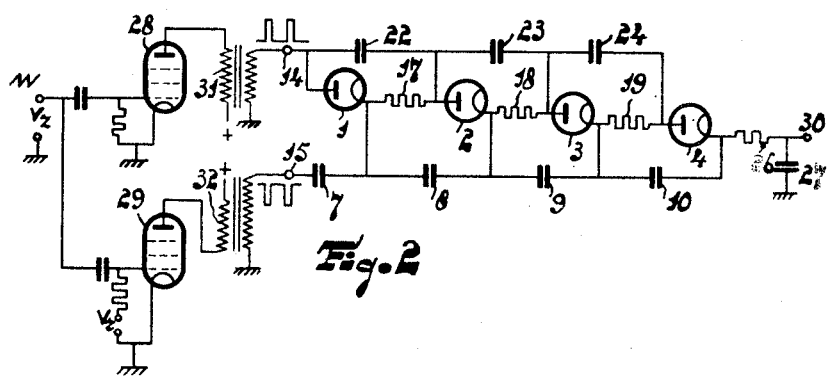
Figs. 2 and 3, show circuit-arrangements comprising controllable and a non-controllable pulse voltage source, producing pulses of opposite polarities.

Fig. 2 shows a circuit-arrangement, in which the voltage multiplier also comprises the series combination of rectifiers 1, 2, 3 and 4 alternating with resistances 17, 18 and 19. The two pulse generators 14 and 15, of which the latter is controllable produce pulses of opposite polarities; these pulses are required to occur simultaneously, for example, due to the two pulse generators being controlled by the same sawtooth voltage Vz. Pulses of positive polarity are supplied to at least one but preferably to all of the anodes of the diodes 1, 2, 3 and 4, whereas pulses of negative polarity are supplied to at least one but preferably to all of the cathodes of these diodes, the blocking capacitors 7, 8, 9, 10 and 22, 23, 24 blocking the direct voltage produced. The high voltage produced is fed through a smoothing filter 26, 27 to the output terminal 30.

Figure 3:
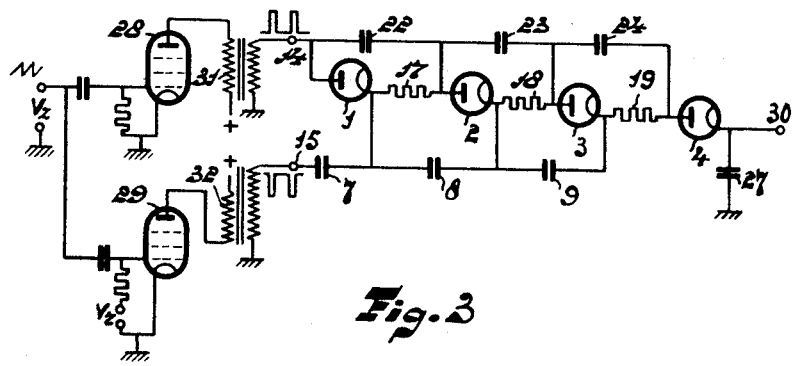

The circuit-arrangement shown in Fig. 3 is differentiated from that shown in Fig. 2 by the fact that the cathode of the diode 4, is not connected to the negative-going pulse voltage source through capacitor 10 (and if necessary through capacitors 9, 8, 7) but is connected to earth through a capacitor 27, for example, the natural capacity of the cathode-ray tube. In this case the high voltage produced will be lower than in the case shown in Fig. 2 but the smoothing filter 26, 27 of this figure may be dispensed with.

Figure 4:
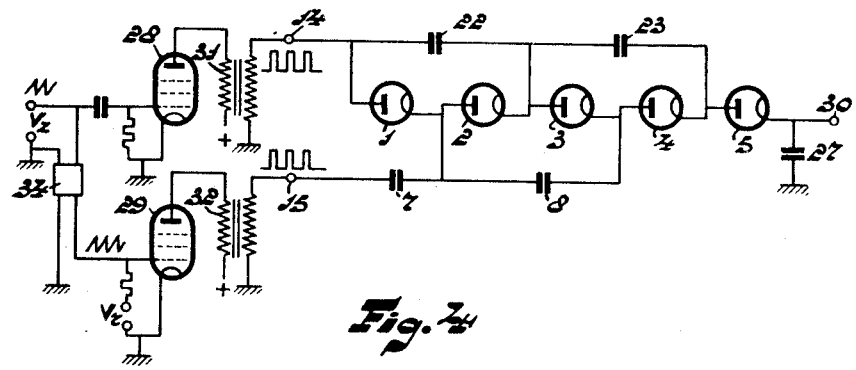
Fig. 4 shows a circuit-arrangement comprising a controllable and a non-controllable pulse voltage source again producing pulses of similar polarities.

Fig. 4 shows a circuit-arrangement in which the voltage multiplier comprises the series combination of diodes 1, 2, 3, 4 and 5 only, the pulse generators 14 and 15 producing pulsatory voltages of similar polarities, i. e. of positive polarities. The controlled and uncontrolled voltage impulses however, must not always occur simultaneously. This may be achieved, for example, by controlling the tube 28 with the use of a sawtooth voltage Vz, and the tube 29 by a voltage derived from the said sawtooth voltage Vz, for example, by supplying the latter to a delay circuit known per se and not further described herein. As an alternative, the circuit of the tube 29 may be self-oscillating and tuned to a frequency differing from the sawtooth frequency of the voltage Vz supplied to the tube 28.

The pulse of similar polarities produced by the two pulse voltages sources 14 and 15 are supplied to the electrodes corresponding to the positive polarity, i. e. positive-going pulses are supplied to the anodes of the rectifiers 1, 2, 3, 4 and 5 such that these anodes are alternately connected, in this case through capacitors 7, 8, 9, 22 and 23, to the one and to the other pulse voltage source. Again, the high voltage produced is fed through a smoothing filter 26, 27 to the output terminal 30. Compared with each other, the circuit-arrangements shown have advantages and disadvantages. Thus, for example, the circuit-arrangement shown in Fig. 4 has the advantage that the coupling resistances 17, 18 and 19 between the rectifiers are omitted but has the disadvantage that for producing the same high voltage a greater number of diodes is required, than, for example, in the circuit-arrangements shown in Figs. 2 and 3.

The polarity of the pulses is indicated in each of the arrangements described so that a positive direct voltage is produced. By reversing this polarity and the conducting phase of the diodes, a negative direct voltage will be produced in an exactly similar manner.

The circuit-arrangements are furthermore adapted to be combined with one another. Thus, for example, the rectifier circuit 1, 2, 3, 4, 5, 7, 8, 22, 23 shown in Fig. 4 may be arranged to follow the circuit 28, 29, 31, 32, 35 shown in Fig. 1.

What we claim is:

1. Apparatus for producing a high direct voltage comprising a voltage multiplier network having a plurality of rectifiers serially connected in the same sense and a group of capacitors coupled to said rectifiers in a circuit in which at least one terminal of a succeeding capacitor in the group exhibits a potential difference relative to ground which exceeds the potential difference between either of the electrodes of the preceding capacitor and ground, a source of unregulated pulses, a source of regulated pulses, and means to supply said regulated and unregulated pulses as an input to said multiplier network to produce a direct output voltage which is the summation of a whole multiple of the rectified regulated pulses and a whole multiple of the rectified unregulated pulses.

2. Apparatus as set forth in claim 1 wherein said unregulated pulses have a predetermined polarity and said regulated pulses are opposed in polarity to said unregulated pulses and are produced simultaneously therewith.

3. Apparatus for producing a high direct voltage comprising a voltage multiplier network having a plurality of rectifiers serially connected in the same sense, each rectifier having first and second elements therefor, a like plurality of impedances conductive to direct current, each impedance being interposed between successive rectifiers, a first group of capacitors coupled to the first elements of said rectifiers in a circuit in which at least one terminal of a succeeding capacitor in the group exhibits a potential difference relative to ground which exceeds the potential difference between either of the electrodes of the preceding capacitor and ground and a second group of capacitors coupling the second elements of said rectifiers to ground, a source of unregulated pulses having a predetermined polarity, a source of regulated pulses of like polarity, and means to supply said regulated and unregulated pulses to said first group of capacitors as an input to said multiplier network to produce a direct output voltage which is the summation of a whole multiple of the rectified regulated pulses and a whole multiple of the rectified unregulated pulses.

4. Apparatus as set forth in claim 3 wherein corresponding elements of the serially connected rectifiers are connected through capacitors of the first group alternately to one and to the other of said sources.

5. Apparatus as set forth in claim 4 wherein said regulated and unregulated pulses of said sources are displaced in time relative to each other.

6. Apparatus for producing a high direct voltage comprising a voltage multiplier network having a plurality of rectifiers serially connected in the same sense, a like plurality of impedances conductive to direct current, each impedance being interposed between successive rectifiers and a group of capacitors coupled to said rectifiers in a circuit in which at least one terminal of a succeeding capacitor in the group exhibits a potential difference relative to ground which exceeds the potential difference between either of the electrodes of the preceding capacitor and ground, a source of unregulated pulses of predetermined polarity, a source of regulated pulses opposed in polarity to said unregulated pulses and produced simultaneously therewith, and means to supply said regulated and unregulated pulses as an input to said multiplier network to produce a direct output voltage which is the summation of a whole multiple of the rectified regulated pulses and a whole multiple of the rectified unregulated pulses.

7. Apparatus as set forth in claim 6 wherein each rectifier has first and second elements therefor and wherein said unregulated pulses are supplied through a portion of said group of capacitors to the first elements of said rectifiers, and regulated pulses being supplied through the remainder of said group of capacitors to the second elements of said rectifiers.

8. Apparatus as set forth in claim 7 wherein one of the electrodes of the last rectifier in the rectifier serial connection is capacitively grounded.

BERNARDUS WILLEM van INGEN SCHENAU.
GERRIT JAN LUBBEN.

No references cited.